United States Patent
Messenger et al.

(10) Patent No.: US 7,522,519 B2
(45) Date of Patent: Apr. 21, 2009

(54) APPARATUS, AND ASSOCIATED METHOD, FOR ASYNCHRONOUSLY PRE-RESERVING CHANNEL TO EFFECTUATE AN INTERACTIVE PACKET COMMUNICATION SERVICE IN A RADIO COMMUNICATION SYSTEM

(75) Inventors: Henry Messenger, Campbell, CA (US); Sami A. Tabikh, Richmond, CA (US)

(73) Assignee: Nokia Corporation, Espoo (FI)

( * ) Notice: Subject to any disclaimer, the term of this patent is extended or adjusted under 35 U.S.C. 154(b) by 687 days.

(21) Appl. No.: 10/930,680

(22) Filed: Aug. 31, 2004
(Under 37 CFR 1.47)

(65) Prior Publication Data
US 2006/0045114 A1    Mar. 2, 2006

(51) Int. Cl.
H04L 12/56 (2006.01)
(52) U.S. Cl. .................. 370/230; 370/235; 455/466; 455/509
(58) Field of Classification Search ................ 370/431, 370/229, 328, 235, 473; 455/466, 509, 450; 710/100
See application file for complete search history.

(56) References Cited

U.S. PATENT DOCUMENTS

| | | | |
|---|---|---|---|
| 6,430,163 B1 | 8/2002 | Mustajarvi | |
| 7,248,887 B2 * | 7/2007 | Zhang et al. | 455/509 |
| 7,356,494 B2 * | 4/2008 | Ehrman et al. | 705/28 |
| 2003/0078059 A1 * | 4/2003 | Hamiti et al. | 455/466 |
| 2004/0133720 A1 * | 7/2004 | Slupsky | 710/100 |
| 2005/0047335 A1 * | 3/2005 | Cheng et al. | 370/229 |
| 2005/0249118 A1 * | 11/2005 | Terry et al. | 370/235 |
| 2005/0265277 A1 * | 12/2005 | Thadasina et al. | 370/328 |

FOREIGN PATENT DOCUMENTS

| | | |
|---|---|---|
| EP | 1380185 | 1/2004 |
| EP | 1393511 | 3/2004 |
| WO | WO 00/33498 | 6/2000 |
| WO | WO 01/20924 | 3/2001 |

* cited by examiner

*Primary Examiner*—Chi H Pham
*Assistant Examiner*—Albert T Chou
(74) *Attorney, Agent, or Firm*—Alston & Bird LLP

(57) ABSTRACT

Apparatus, and an associated method, is provided to facilitate communications pursuant to an interactive packet radio communication service, such as an interactive gaming service. When data is to be communicated by a gaming device, or other mobile node, request for channel allocation is made. And, packet data generated at the gaming device is buffered at a buffer and selectably manipulated when buffered thereat pending grant of a channel allocation. Because the data is permitted to be manipulated pending grant of the channel allocation, data packets that become obsolete during the pendency are overwritten, or otherwise caused not to be sent, thereby more efficiently utilizing the channel allocation allocated to effectuate the communication service.

22 Claims, 4 Drawing Sheets

APPARATUS, AND ASSOCIATED METHOD, FOR ASYNCHRONOUSLY PRE-RESERVING CHANNEL TO EFFECTUATE AN INTERACTIVE PACKET COMMUNICATION SERVICE IN A RADIO COMMUNICATION SYSTEM

The present invention relates generally to a manner by which to facilitate communication of packet data pursuant to an interactive packet communication service, such as an interactive gaming service, in a radio communication system. More particularly, the present invention relates to apparatus, and an associated method, for requesting channel allocation upon which to communicate the packet data, and for selectably manipulating the data pending grant of the channel allocation to communicate the data.

By permitting manipulation of the data, pending channel grant, data packets that have become obsolete, or otherwise no longer need to be communicated, can be discarded. Better use of the limited channel capacity allocated to the effectuation of the communication service is permitted as unneeded data packets are not communicated. And, the data communications are effectuated at reduced levels of latency, improving the quality of the interactive gaming, or other communication, service.

BACKGROUND OF THE INVENTION

A communication system includes, at a minimum, a set of communication stations including at least one sending station and at least one receiving station. The communication stations of the set of communication stations that are parties to a communication session during which a communication service is effectuated are interconnected by a communication channel. A sending station sends data upon the communication channel for delivery to a receiving station. And, a receiving station detects delivery of the data, once communicated upon the communication channel, and recovers the informational content thereof.

A wide variety of different types of communication systems have been developed and deployed. Many are regularly utilized to effectuate communication of data between sending and receiving stations. And, with continued advancements in communication technologies, additional, and improved communication services shall likely become available as such advancements are implemented in communication systems. A radio communication system is exemplary of a type of communication system that is used by which to communicate data and that has incorporated advancements in communication technologies. In a radio communication system, the communication channel that interconnects the sending and receiving stations is formed of a radio channel defined upon a radio link, a portion of the electromagnetic spectrum. A wireline connection extending between the communication stations of a radio communication system is obviated. And, the communication stations of the radio communication system need not be positioned at locations at which wireline connections are available. Communications by way of radio communication systems are thereby possible even from, and between, locations at which wireline connections are not possible or practical.

Amongst the advancements in communication technologies that have been implemented in radio, as well as other, communication systems are advancements in communication techniques. Digital communication techniques permit communications between communication stations to be effectuated more efficiently and increase the possibility of successful communication of data in adverse communication conditions.

In some communication systems, digital data is formatted into packet datas and, once packetized, the packets of data are communicated to effectuate the data communications. The packet data rates, i.e., the rates at which data packets are communicated, are high enough to permit interactive communication services to be effectuated between communication stations that are parties to a communication session.

An interactive gaming service, for instance, is a type of interactive communication service that is sometimes implemented by way of a packet communication system. Participants in the interactive game that is played pursuant to the interactive gaming service participate in the game through use of appropriate communication stations that permit the effectuation of the gaming service. Packet communication systems that provide for the effectuation of gaming services include both conventional wireline communication systems as well as radio communication systems.

A cellular communication system, an exemplary type of radio communication system, generally provides for packet-based communications. New-generation, cellular communication systems, for instance, second-generation, third-generation, and successor-generation cellular communication systems, provide for packet-based communications. Increasingly data-intensive, packet communication services are available in successive generations of the cellular communication systems. And, increasingly data-intensive gaming services are implementable by way of such cellular communication systems.

A participant in a gaming service effectuable by way of a cellular communication system utilizes, for instance, a mobile station that communicates packet data by way of a radio air interface defined in the cellular communication system and by way of packet connections formed in the network part of the communication system. The data is communicated between the mobile station operated by the game participant and a game server, a communications device positioned at the network part of the communication system. The gaming service is effectuated by way of interactive communications between the mobile station and the game server.

The radio air interface defined in a cellular communication system exhibits characteristics that potentially interfere with the game participant's enjoyment of the gaming service. In particular, the radio air interface is bandwidth-constrained, and packet data is communicated subsequent to allocation of channel bandwidth to permit the data to be communicated. And, the channels that are allocated are generally not dedicated channels, dedicated to the mobile station for the duration of the gaming, or other packet, communication service. Instead, channel allocations are made to the mobile station responsive to request for the allocation and the channel allocations are allocated merely to permit the communication of a packet or group of packets.

Time latency results. That is to say, the mobile station used by the game participant, prior to communication of a data packet, must request the allocation of channel capacity to communicate the data packet. And, when subsequent data packets are to be communicated, the request and allocation procedures must be repeated. The time latency results as the mobile station must request the channel allocation when there is a data packet to communicate and await allocation of the channel prior to communicating the data packet. This latency time results in a time delay that, in some systems, might well exceed a 300-500 ms time delay, depending upon the state of the mobile station. During this period, the data packet or packets that are to be communicated might become obsolete or otherwise no longer need to be transmitted pursuant to effectuation of the gaming service. Additionally, the game server, at which game client software is resident, is not informed of the availability of the channel, when allocated.

As existing schemes by which to effectuate gaming services by way of a packet radio communication system might result in the communication of obsolete, or otherwise unnecessary, data packets, the limited channel availability of the radio air interface is inefficiently utilized.

If a manner could be provided by which better to reserve channel allocations and identify obsolete data packets prior to their communication, improved communications would be permitted.

It is in light of this background information related to communications in a packet radio communication system that the significant improvements of the present invention have evolved.

SUMMARY OF THE INVENTION

The present invention, accordingly, advantageously provides apparatus, and an associated method, by which to facilitate communication of packet data pursuant to an interactive packet communication service, such as an interactive gaming service, in a radio communication system. Through operation of an embodiment of the present invention, a manner is provided by which to request channel allocation upon which to communicate the packet data and for selectably manipulating the data pending grant of the channel allocation request.

Manipulation of the data, pending the grant of the channel allocation request, permits data packets that have become obsolete, or otherwise no longer need to be communicated, to be discarded and not subsequently transmitted. Better use of the limited channel capacity allocated to the effectuation of the communication service is facilitated. Unneeded data packets are not communicated, and communication latency is reduced. The quality of the interactive gaming, or other communication service, is facilitated.

In one aspect of the present invention, a channel request message is generated at an application layer of a mobile station at which the interactive communication service application resides. The channel request message forms a request for allocation of a channel upon which to communicate, from the mobile station, packet-formatted data. When the interactive packet communication service forms a gaming service, the channel request message is generated at a gaming application, embodied at the application layer of the mobile station.

The mobile station forming a party to the interactive gaming, or other communication, service is implemented, e.g., using a symbian, or other open source, operating system in which input or output control (IOCTL) commands are defined. The channel request message forms, e.g., an IOCTL command. The channel request message, generated at the application layer, is provided to the radio layer of the mobile station. And, the mobile station, in turn, sends a radio-layer, packet channel request. When the communication system forms a GSM/GPRS (global system for mobile communications/general packet radio service) communication system, the radio-layer channel request forms a GPRS-packet channel request.

In another aspect of the present invention, the radio layer of the mobile station detects a channel assignment, returned to the mobile station by a network part of the communication system. The channel assignment forms a response to the packet channel request. The radio layer generates a request-response detection message responsive to the delivery to the mobile station of the channel assignment. When the mobile station operates pursuant to a symbian operating system, or other operating system that defines IOCTL commands, the request-response detection message forms an IOCTL command. The message, generated at the radio layer of the mobile station, is provided to the application layer of the mobile station.

In another aspect of the present invention, the mobile station includes a buffer at which data packets generated at the application layer of the mobile station during effectuation of the gaming, or other communication, service are buffered. The data buffered at the buffer is selectably buffered at the buffer pending channel allocation responsive to the channel request. While the data is buffered at the buffer, the data is available for manipulation at the mobile station. Data overwriting, data deletion, and alteration of unit size and header information are all manipulation operations that are performable upon the data buffered at the data buffer.

If, during pendency of the channel request, a determination is made at the mobile station that the informational content of the data packet has become obsolete, or for some other reason, the data packet no longer needs to be communicated, the data packet is deleted, such as by overwriting the data packet with another data packet or merely discarding the data packet. And, packet size and packet content is alterable to, e.g., optimize the transmission unit size and header information of the communicated data packets.

Once the channel assignment, allocated at the network part of the communication system, is delivered to the radio layer of the mobile station and the request-response message is generated and delivered to the application layer, the buffered data is provided to the radio layer pursuant to effectuation of the gaming, or other interactive packet communication, service. More efficient utilization of the limited channel resources is made as data not required to be communicated is not communicated. And, reduced latency of the interactive service is apparent to game participants, or other users, of the service.

In these and other aspects, therefore, apparatus, and an associated method, is provided for a communication station operable to communicate packet-formatted data. The packet-formatted data is communicated pursuant to a packet communication service. The data is communicated with a remote station by way of a channel defined upon a radio air interface. The communication station has an application layer and a radio layer. A channel request message generator is embodied at the application layer. The channel request message generator generates a channel request message to request allocation of the channel to communicate the packet formatted data. A data buffer and manipulator buffers the packet formatted data pending allocation of the channel responsive to the channel request message. And, the data buffer and manipulator selectably manipulates the packet-formatted data buffered thereat pending the allocation of the channel.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
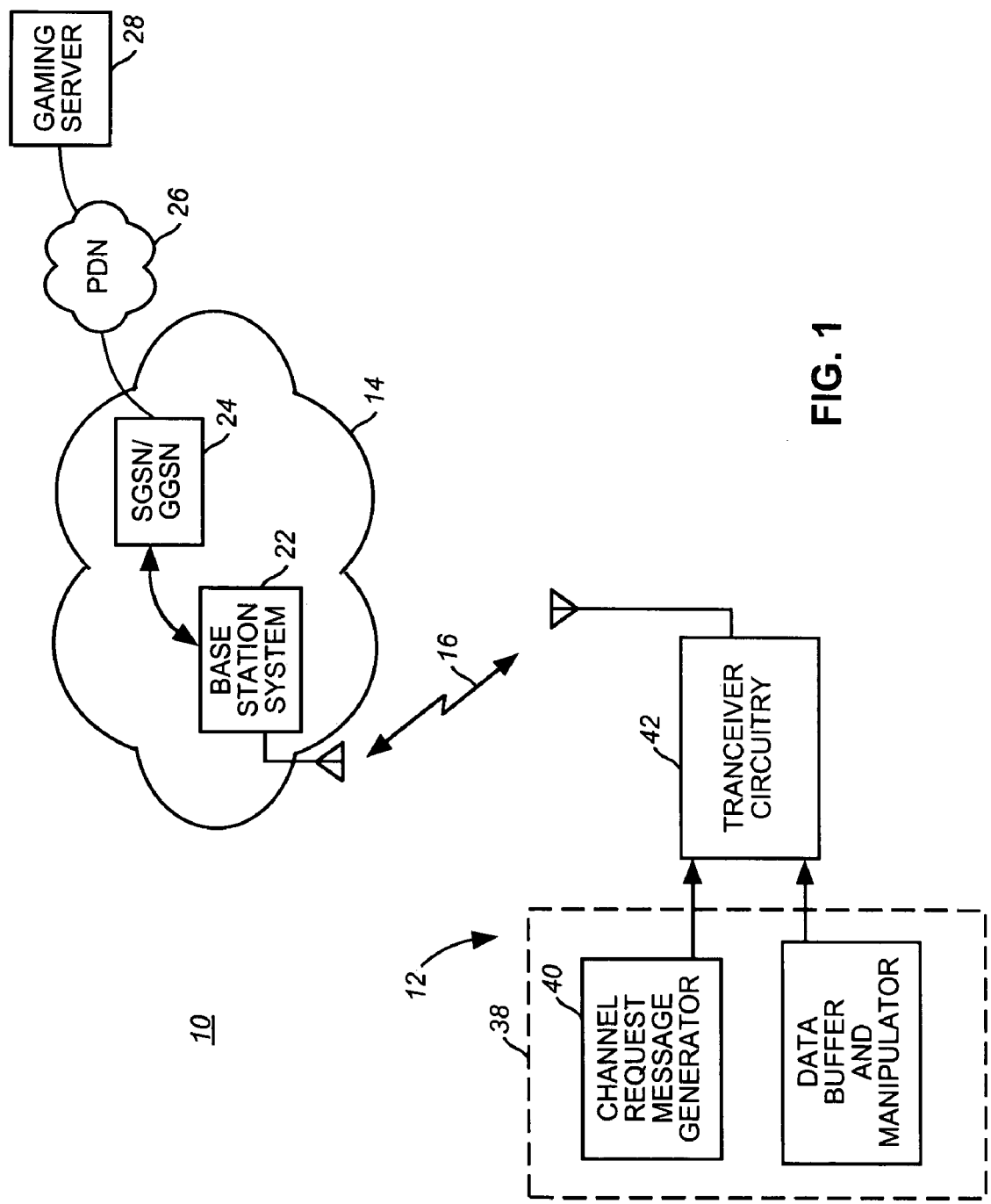
FIG. 1 illustrates a functional block diagram of a packet radio communication system in which an embodiment of the present invention is operable.

Referring first to FIG. 1, a packet radio communication system, shown generally at 10, provides for the effectuation of packet radio communication services with mobile stations and of which the mobile node 12 is representative. In the exemplary implementation, the communication system is operable in general conformity with the operating protocols and parameters set forth in the GSM/GPRS (Global System for Mobile communications/General Packet Radio Service) operating specification. While the following description shall describe exemplary operation of an embodiment of the present invention with respect to its implementation in a packet radio communication system operable generally pursuant to the GSM/GPRS operating specification, it should be understood that, in other implementations, an embodiment of the present invention is analogously operable in other types of packet radio communication systems.

The communication system includes a network part, here including a radio access network 14. The radio access network 14 includes elements that permit for the communication, by way of a radio air interface 16, with the mobile node. Two-way communication of data is effectuated by way of appropriately-defined channels on the radio air interface. That is to say, data originated at the network part of the communication system is communicated upon downlink channels defined upon the radio air interface, and data originated at the mobile node is communicated upon uplink channels for delivery to the network part of the communication system.

The radio access network is formed of functional entities, here including a base station system (BSS) 22. The base station system includes base transceiver station and base station controller functionality. The base station system is coupled to an SGSN/GGSN (Serving GPRS Service Node/Gateway GPRS Service Node) 24. The radio access network includes other entities (not shown), the details of which are set forth in the GSM/GPRS operating specification.

The SGSN/GGSN together define a node that is connectable to a packet data network (PDN) 28, such as the Internet backbone. The correspondent entities, in conventional manner, are connectable to the packet data network. An exemplary correspondent entity, here a gaming server 28, is shown to be connected to the packet data network.

An end-to-end packet communication service is effectuable between the gaming server and the mobile node. In the exemplary implementation, the packet communication service forms an interactive gaming service, and the mobile node forms a mobile gaming device. Exemplary operation of the communication system shall further be described with respect to effectuation of an interactive gaming service. More generally, the application effectuable during operation of the communication service comprises any packet communication service.

Communication of packet data pursuant to effectuation of a packet communication service in a GSM/GPRS network, as well as various others, requires that the network allocate a channel for communication of the packet data. When packet data is originated at the gaming device formed of the mobile node, the mobile node requests allocation of channel capacity to communicate the packet data by way of an uplink channel. And, the network part of the communication system, upon receipt of the channel allocation request, selects whether to grant the channel allocation request. If a channel allocation request is granted, indications of the channel allocation grant are returned to the mobile node, and the mobile node effectuates the communication of the packet data on the allocated channels. Packet data is conventionally queued during dependency of the channel allocation request and grant, a delay that regularly exceeds several hundred milliseconds in duration. During the pendency of the request, the packet data that is queued, awaiting communication, might become obsolete, such as the result of additional communication-service processing at the mobile node. In conventional operation, the packet data, once queued in line for communication to the network part, is communicated, irrespective of whether the packet data is obsolete, when the channel capacity is allocated.

The mobile node, pursuant to an embodiment of the present invention, includes apparatus selectably operable at the mobile node in conjunction with operation of the mobile node pursuant to a data communication service in which data, originated at the mobile node, is to be communicated to the network part. And, with particular respect to the implementation shown in FIG. 1 in which the communication service forms an interactive gaming service in which a gaming application, resident at the mobile node, is executed during the effectuation of the communication service. And, as a result of the execution of the gaming application, data is generated that is to be communicated, interactively, with a correspondent entity, here the gaming server 28. The apparatus 38 is functionally represented, formed of the functional entities that are implementable in any desired manner, such as, e.g., algorithms executable by processing circuitry.

Here, the apparatus is shown to include a channel request message generator that operates to generate a channel request message when packet data, generated pursuant to execution of the gaming application, or other packet communication service, is to be communicated pursuant to effectuation of the service.

The message generated by the message generator is provided to transceiver circuitry 42 of the mobile node and caused to be communicated by way of an uplink channel defined upon the radio air interface for delivery to the radio access network 14. Upon delivery of the channel request message to the network, the network selectably allocates channel resources for the effectuation of the communication of the packet data.

Packet data that is generated is buffered at a buffer and manipulator 44 pending allocation of the communication resources to permit the communication of the packet data to the network. The buffer and manipulator is further selectably operable to manipulate the data buffered thereat pending the channel allocation and communication of the buffered data thereon. If a data packet buffered at the buffer is determined to be obsolete, or is otherwise no longer needed to be communicated, the data packet is deleted, such as by overwriting the data packet with a subsequently-generated data packet, or otherwise is marked to not be sent. Indications of such determinations, as well as others, are provided to the buffer and manipulator, here by way of the line 52. Additional data manipulations are also performable upon the buffered data, such as modification of transmission unit size and header information to optimize communication of the packet data when the packet data is subsequently communicated.

Because the data buffered at the data buffer is selectably manipulated, such as to cause obsolete data packets to not be communicated by the mobile node to the network part, more efficient use of the communication resources allocated for communication upon the radio air interface are permitted.

FIG. 2 again illustrates the mobile node 12 forming part of the radio communication system shown in FIG. 1. Here, the transceiver circuitry 42 is represented as a GPRS radio modem that forms the radio layer, including, e.g., the logical PHY layer. The mobile node here further is shown to include an application layer, here represented by a games client software layer 56. During performance of the interactive gaming service, the games client software is executed and data packets are generated. The data packets are provided, here by way of the line 57, for storage at the buffer and manipulator 46.

The channel request message generator 40 is here shown to be embodied at the application layer at which the games client software is resident. When a message is generated by the message generator, the message is provided, here indicated by way of the line 58 as an IOCTL (input output control) in the Symbian socket class of the Symbian operating system pursuant to which the mobile station is operable. The messages generated by the message generator are provided, by way of a GPRS network interface 64, to the GPRS radio modem 42. And, the circuitry of the radio layer, in turn, generates messages, communicated upon the radio air interface to the network part (shown in FIG. 1) of the communication system to request allocation of channel capacity for communication of the data packets.

Messages that identify grant of channel allocation are returned to the mobile node and detected at the radio layer 42 of the mobile node. The apparatus 38 further includes, embodied at the radio layer, a request-response (RR) detection generator, 72. The request response detection generator operates to generate a request-response detection message that is communicated, here indicated by way of the lines 74, from the radio layer at which the radio modem 42 is embodied to the application layer at which the games client software 56 is embodied. In the exemplary implementation, the request response detection message forms an IOCTL (input output control) command in the Symbian operating system socket class.

Responsive to delivery of the request response detection message to the application layer, data buffered at the buffer 46 is released to the radio layer, here indicated by way of the line 76, and the data is communicated pursuant to the interactive communication service.

Figure 2:
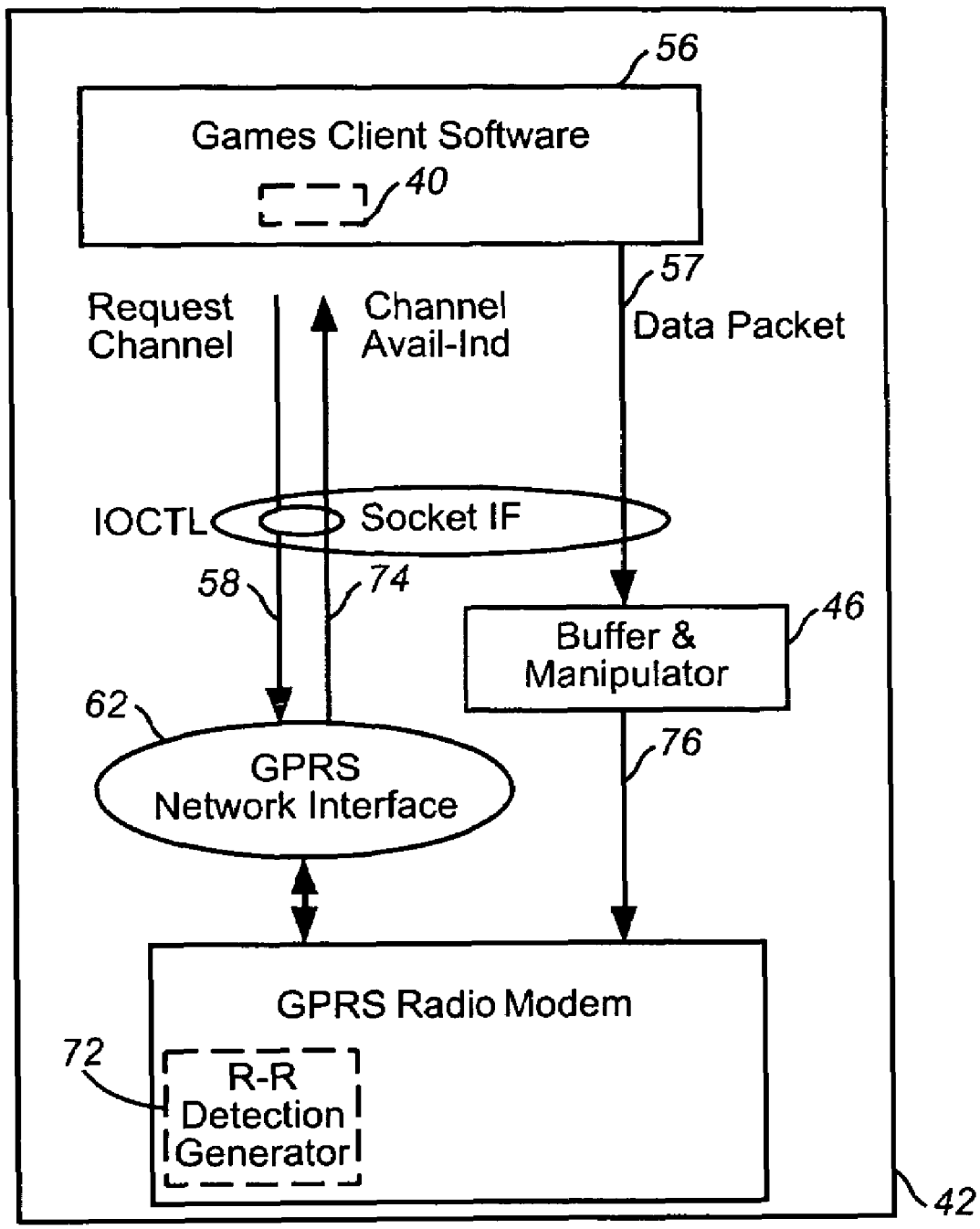
FIG. 2 illustrates a functional block diagram of portions of the packet radio communication system shown in FIG. 1.
Figure 3:
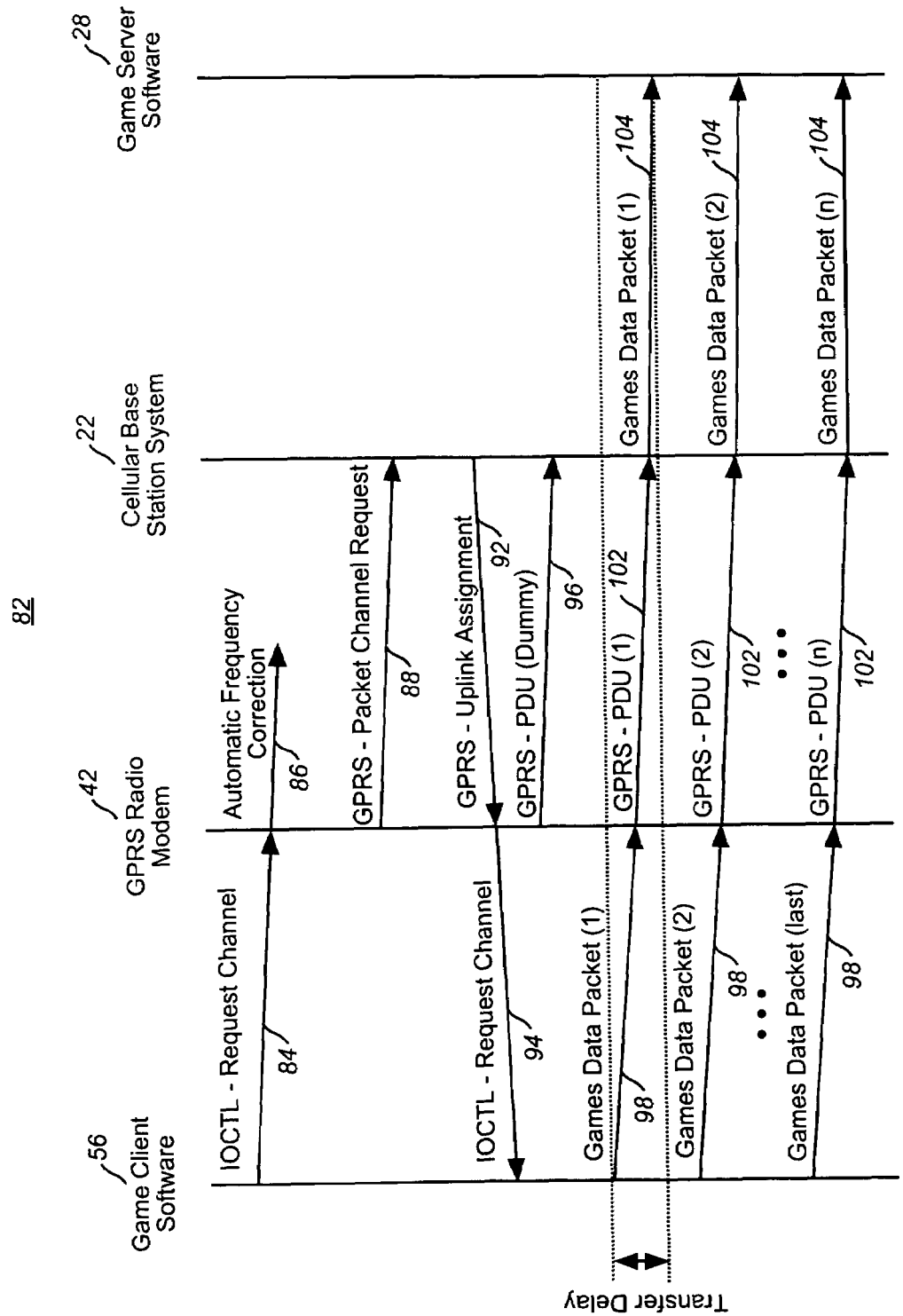
FIG. 3 illustrates a message sequence diagram representative of signaling generated during operation of the radio communication system shown in FIGS. 1 and 2.

FIG. 3 illustrates a message sequence diagram, shown generally at 82, representative of signaling generated during operation of the packet radio communication system shown in FIGS. 1 and 2. Signaling shown in the message sequence diagram illustrates signaling between the games client software 56 embodied at the application layer of the mobile node, the GPRS radio modem 42 embodied at the radio layer of the mobile node, the base station system 22 of the radio access network, and game server software embodied at the gaming server 28.

When, pursuant to execution of the games client software, data is generated that is to be communicated by the games client software to the game server software pursuant to the interactive gaming communication service, the games client software generates an IOCTL channel request command. The command is communicated, indicated by the segment 84, from the application layer to the GPRS radio modem. At the radio layer, automatic frequency correction signals are generated, indicated by the segment 86. And, the radio layer of the mobile node generates a GPRS-defined, packet channel request, indicated by the segment 88. The request is communicated, at the radio layer, by the GPRS radio modem to the cellular base station system. Upon delivery at the base station system, a channel allocation is selectably granted, and indications of the grant are returned, indicated by the segment 92, to the radio layer of the mobile node. And, as indicated by the segment 94, an IOCTL channel request response message is created at the radio layer of the mobile node and communicated to the application layer at which the games client software is resident. Here, channel allocation is made, and packet data is released for communication from the mobile node to the radio access network. First, a GPRS-formatted packet data unit (PDU) forming a dummy packet is first communicated, indicated by the segment 96. Thereafter, application-layer generated data packets are provided, here indicated by the segments 98, to the radio layer. And, the radio layer formats the data packets pursuant to the GPRS formatting and communicates, indicated by the segments 102, the packets to the base station system. The packets are then forwarded, indicated by the segments 104, by the base station system to the game server software embodied at the gaming server 28.

Figure 4:
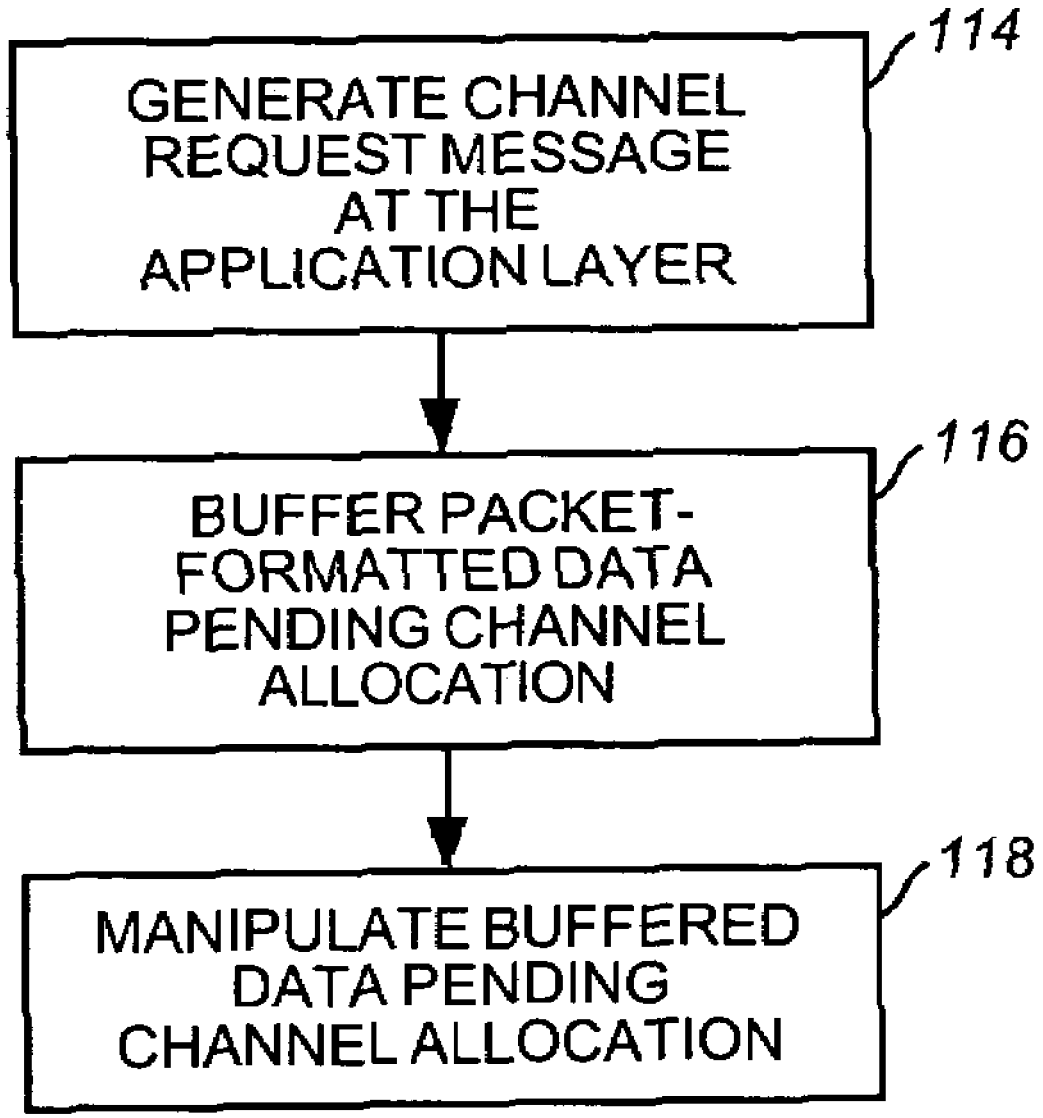
FIG. 4 illustrates a method flow diagram that lists the method of operation of an embodiment of the present invention.

FIG. 4 illustrates a method flow diagram, shown generally at 112, representative of the method of operation of an embodiment of the present invention. The method 112 facilitates communication of packet-formatted data, communicated pursuant to a packet communication service, between a communication station and a remote station by way of a channel defined upon a radio air interface. The communication station has an application layer and a radio layer.

First, and as indicated by the block 114, a channel request message is generated at the application layer. The channel request message requests allocation of a channel to communicate the packet-formatted data.

Then, and as indicated by the block 116, packet-formatted data is buffered, pending allocation of the channel responsive to the channel request message. And, as indicated by the block 118, the packet-formatted data is selectably manipulated pending allocation of the channel.

Data packets that become obsolete while the grant of the channel allocation request is pending are overwritten pursuant to manipulation of the data packets places the data packets in more efficient form for communication upon grant of the channel allocation.

The previous descriptions are of preferred examples for implementing the invention, and the scope of the invention should not necessarily be limited by this description. The scope of the present invention is defined by the following claims.

What is claimed is:

1. An apparatus comprising:
    a channel request message generator embodied at an application layer of a communication station, said channel request message generator configured to generate a channel request message to request allocation of a channel defined upon a radio air interface for the communication station to communicate packet-formatted data from the communication station to a remote station; and
    a data buffer and manipulator configured to buffer the packet-formatted data at the communication station pending allocation of the channel responsive to the channel request message, further configured to selectably manipulate the packet-formatted data buffered at the communication station pending the allocation of the channel by modifying the buffered packet-formatted data, and further configured to provide the modified packet-formatted data to the radio air interface responsive to the channel being assigned.

2. The apparatus of claim 1 wherein the communication station comprises an operating system and wherein the channel request message comprises an operating system defined message.

3. The apparatus of claim 2 wherein the operating system comprises an open source operating system that defines input-output control commands, and wherein the channel request message comprises a first defined input-output control command.

4. The apparatus of claim 3 wherein the open source operating system comprises Symbian operating system that defines a socket class and wherein the first defined input-output control command comprises a socket class command.

5. The apparatus of claim 1 wherein the channel request message generator is further configured to communicate the channel request message to the radio layer of the communication station.

6. The apparatus of claim 1 wherein the communication station is configured to form part of a radio communication system, wherein delivery of the channel request message precipitates generation of a radio-layer request for communication upon the radio air interface and of a response thereto, said apparatus further comprising a request-response detection generator embodied at the radio layer, said request-response detection generator configured to generate a request-response detection message responsive to delivery to the radio layer of a response to the radio-layer request.

7. The apparatus of claim 6 wherein the communication station comprises an open source operating system that defines input-output control commands, and wherein said request-response detection message comprises a second defined input-output control command.

8. The apparatus of claim 6 wherein the request-response detection generator is further configured to deliver the request-response detection message to the application layer of the communication station.

9. The apparatus of claim 8 wherein the data buffer and manipulator is further configured to selectably provide the packet-formatted data to the radio layer in response to delivery of the request-response detection message to the application layer.

10. The apparatus of claim 6 wherein the response to the radio-layer request comprises channel grant indicia, and wherein the request-response detection message generated by said request response detection generator includes indications of the channel grant indicia.

11. The apparatus of claim 1 wherein modifying the buffered packet-formatted data comprises overwriting selected data packets of the packet formatted data.

12. The apparatus of claim I wherein modifying the buffered packet-formatted data comprises manipulation of transmission unit size of the packet formatted data.

13. The apparatus of claim 1 wherein modifying the buffered packet-formatted data comprises manipulation of header information of the packet formatted data.

14. The apparatus of claim 1 wherein modifying the buffer packet-formatted data comprises deletion of selected parts of the packet formatted data.

15. The apparatus of claim 1 wherein the packet communication service comprises an interactive gaming service and wherein the packet formatted data buffered and manipulated by said data buffer and manipulator comprises data generated at the communication station pursuant to performance of the interactive gaming service.

16. A method comprising:
generating, at an application layer of a communication station, a channel request message to request allocation of a channel defined upon a radio air interface of the communication station to communicate packet-formatted data from the communication station to a remote station;
buffering the packet formatted data pending allocation of the channel responsive to the channel request message;
selectably manipulating the packet formatted data pending allocation of the channel by modifying the buffered packet-formatted data; and
providing the modified packet-formatted data to the radio air interface responsive to the channel being assigned.

17. The method of claim 16 wherein modifying the buffered packet-formatted data comprises selectably overwriting selected parts of the packet formatted data buffered during said operation of buffering.

18. The method of claim 16 wherein the communication station comprises an open source operating system that defines input-output control commands and wherein the channel request message comprises a first defined input-output control command.

19. The method of claim 16 further comprising the operation of detecting a response to the channel request message.

20. The method of claim 19 further comprising the operation of selectably providing the packet formatted data to the radio layer of the communication station responsive to detection of the response to the channel request message.

21. An apparatus, comprising:
a processor configured to request allocation of a channel defined upon a radio air interface for a radio layer of a communication station to communicate packet-formatted data, further configured to buffer the packet-formatted data pending allocation of the channel responsive to the channel request message, further configured to selectably manipulate the buffered packet-formatted data by modifying the buffered packet-formatted data pending the allocation of the channel, and further configured to provide the modified packet-formatted data to the radio air interface responsive to the channel being assigned.

22. An apparatus comprising a processor and a memory storing executable program instructions programmed to execute on the processor to cause the processor to at least request allocation of a channel defined upon a radio air interface for a radio layer of a communication station to communicate packet-formatted data, to buffer the packet-formatted data pending allocation of the channel responsive to the channel request message, to selectably manipulate the buffered packet-formatted data by modifying the buffered packet-formatted data pending the allocation of the channel by discarding obsolete data, and to provide the modified packet-formatted data to the radio air interface responsive to the channel being defined and allocated for the radio layer of the communication station.

* * * * *

UNITED STATES PATENT AND TRADEMARK OFFICE
CERTIFICATE OF CORRECTION

| | | |
|---|---|---|
| PATENT NO. | : 7,522,519 B2 | Page 1 of 1 |
| APPLICATION NO. | : 10/930680 | |
| DATED | : April 21, 2009 | |
| INVENTOR(S) | : Messenger et al. | |

It is certified that error appears in the above-identified patent and that said Letters Patent is hereby corrected as shown below:

<u>Column 9,</u>

Line 56, "buffer" should read --buffered--.

Signed and Sealed this

Eighteenth Day of August, 2009

David J. Kappos
*Director of the United States Patent and Trademark Office*